US006996888B1

(12) United States Patent
Wieringa

(10) Patent No.: US 6,996,888 B1
(45) Date of Patent: Feb. 14, 2006

(54) METHOD FOR ATTACHMENT OF ADVERTISEMENTS TO A ROAD BARRIER

(76) Inventor: Lawrence D. Wieringa, 2221 Elsinore Rd., Riverside, CA (US) 92506

( * ) Notice: Subject to any disclaimer, the term of this patent is extended or adjusted under 35 U.S.C. 154(b) by 123 days.

(21) Appl. No.: 10/816,671

(22) Filed: Apr. 2, 2004

Related U.S. Application Data

(62) Division of application No. 10/215,830, filed on Aug. 9, 2002, now Pat. No. 6,718,672.

(51) Int. Cl.
*B23P 11/02* (2006.01)

(52) U.S. Cl. .................................................. 29/525.02

(58) Field of Classification Search ............ 29/525.02, 29/525.11, 897.32
See application file for complete search history.

(56) References Cited

U.S. PATENT DOCUMENTS 2,788,596 A * 4/1957 Schwartz ................. 40/124.18
3,664,626 A * 5/1972 Sneller ..................... 248/224.7
3,969,838 A * 7/1976 Moore ...................... 40/611.06
5,208,585 A * 5/1993 Sprague ................... 340/908.1
5,836,714 A * 11/1998 Christensen ................... 404/6
5,878,519 A * 3/1999 Huyck et al. ................. 40/612
5,993,103 A * 11/1999 Christensen .................... 404/6
6,086,285 A * 7/2000 Christensen ................... 404/6
6,393,748 B1 * 5/2002 Cooper ........................ 40/610
6,676,113 B1 * 1/2004 Christensen ................. 256/25
6,694,896 B1 * 2/2004 Milazzo ...................... 108/115
6,837,647 B1 * 1/2005 Tagg ............................ 404/6
6,840,706 B1 * 1/2005 Camomilla et al. ............ 404/6

* cited by examiner

*Primary Examiner*—David P. Bryant
(74) *Attorney, Agent, or Firm*—Goldstein Law Offices, P.C.

(57) ABSTRACT

A method for displaying an advertisement panel upon a road barrier having a base, a vertical partition having front and rear surfaces, and transverse cavities extending between the surfaces, using a display assembly having a panel sleeve and a pair of mounting brackets for securing the sleeve against the barrier. Each mounting bracket has an insert for extending partially into the transverse cavities. One mounting bracket is mounted against the vertical partition front surface and the other against the vertical partition rear surface. The inserts of the mounting brackets are simultaneously brought into close proximity within the cavities and are mated to hold the brackets and the panel sleeve securely against the vertical partition. The panel sleeve is secured to the mounting bracket and has a horizontal top lip and a horizontal bottom lip. The advertising panels may be easily inserted therebetween for display and removed when desired.

2 Claims, 4 Drawing Sheets

METHOD FOR ATTACHMENT OF ADVERTISEMENTS TO A ROAD BARRIER

CROSS REFERENCES AND RELATED SUBJECT MATTER

This application is a divisional of patent application Ser. No. 10/215,830, filed in the United States Patent Office on Aug. 9, 2002 now U.S. Pat. No. 6,718,672.

BACKGROUND OF THE INVENTION

The invention relates to a display assembly for attachment of advertisements to a road barrier. In particular, the invention is a method for attaching advertisement panels to a road barrier using a display assembly that is selectively attachable to the road barrier and has a vertical partition having a transverse thru cavity. Panels having advertisements displayed thereon are inserted into the display assembly for viewing by passersby and the advertisements may be changed as desired.

Road barriers are often used on roads to block traffic from entering a specific location and are placed between lanes to separate traffic in opposite directions. The barriers are commonly found surrounding construction sites where traffic is redirected. Besides clearing unwanted traffic from the construction area and helping to maintain the safety of construction workers, the barriers also prevent people from entering the sites and possibly sustaining injuries.

The barriers that are typically employed have horizontal bases and vertical partitions extending upward from the bases. Traditionally, most such barriers were cast of concrete. Accordingly, the weight of the barrier by virtue of its fabrication of concrete contributes significantly to its value in preventing automobiles from breaching the barrier. In particular, the horizontal base of such concrete barriers has significant weight. However, a considerable disadvantage of such barriers is that they are difficult to move. Generally as construction progresses, it is necessary to move such barriers often. In certain locales, where barriers are used for traffic control, the barriers might need to be moved several times a day.

To help solve the portability issue while maintaining the integrity of the barrier, "fillable" barriers have been created in recent years. These barriers are typically made of a tough plastic material, and are hollow—making them lightweight and easy to transport when empty. However, once filled, they acquire significant ballasting, making them an effective barrier. Generally, the barriers are substantially water-tight, such that they may be filled with water for ballasting once suitably positioned. Accordingly, moving the barrier is simply preceded by emptying the water—generally by removing a drain plug.

In use, two or more of such barriers may be interlocked to form a temporary wall around an area. Each barrier is filled with water in order to prevent it from tipping over or from being easily moved. Thus, because of the intended purpose of the barrier, it can remain stationary for many hours, and possible many days, at a time.

Because of the exposure the barriers receive, the front and rear surfaces of the barrier vertical partitions may potentially serve as billboards for displaying advertisements. Because these barriers are often used around auto races, and during many televised sporting events, they are highly visible and are highly suitable for advertisement. However, because the barrier is generally constructed of plastic, and is water-filled, it is difficult to securely attach a display device onto the barrier. In this regard, any holes made in the barrier when attaching the display device would compromise the integrity of the barrier, and its ability to hold water therein. Thus, there exists a need for a display assembly constructed for securely coupling with the road barrier. Such an assembly should be easily installable on the barrier without compromising its integrity. The assembly would include a panel on which advertisements are displayed.

While the advertisement display units currently available may be suitable for the particular purpose employed, or for general use, they would not be as suitable for the purposes of the present invention as disclosed hereafter, namely displaying advertisements on road barriers.

SUMMARY OF THE INVENTION

In view of the foregoing disadvantages inherent in the prior art, the present invention provides a method for attaching an advertisement display to a road barrier. As such, the general purpose of the present invention, which will be described subsequently in greater detail, is to provide a new and improved display assembly system for attaching advertisements to a road barrier which has all the advantages of the prior art and none of the disadvantages.

It is an object of the invention to attach a display assembly to a road barrier for displaying advertisements thereon. Accordingly, the display assembly has a mounting bracket assembly and a panel sleeve for holding an advertisement panel. The bracket assembly secures the panel sleeve against the road barrier vertical partition.

It is a further object of the invention to provide an advertisement display upon the barrier without penetrating the barrier with fastening devices or otherwise compromising the integrity of the barrier. Accordingly, the mounting bracket assembly includes a pair of mounting brackets which each extend partially into the transverse thru cavities in the vertical partition of the barrier, where the mounting brackets secure to each other to hold the display assembly against the barrier without "physically attaching" to the barrier.

To attain this, the present invention employs a display assembly for mounting advertisement panels on a road barrier having a vertical partition having a front surface a rear surface, and at least one transverse thru cavity extending between the front surface and rear surface between the top and bottom of the vertical partition. The display assembly has a panel sleeve for holding the advertisement panel in place, and a pair of mounting brackets for securing the panel sleeve against the vertical partition of the barrier. Each mounting bracket has a C-shaped insert for extending partially through cavities in the road barrier vertical partitions. One mounting bracket is mounted against the barrier vertical partition front surface and the other bracket is mounted against the barrier vertical partition rear surface, wherein the C-shaped inserts are secured to each other to hold the brackets and the panel sleeve securely against the vertical partition. The panel sleeve has a horizontal top lip oriented downward and a horizontal bottom lip oriented upward. The advertisement panel is inserted between the panel sleeve lips, thereby displaying the advertisement upon the barrier.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

REFERENCE NUMERALS

Figure 1:
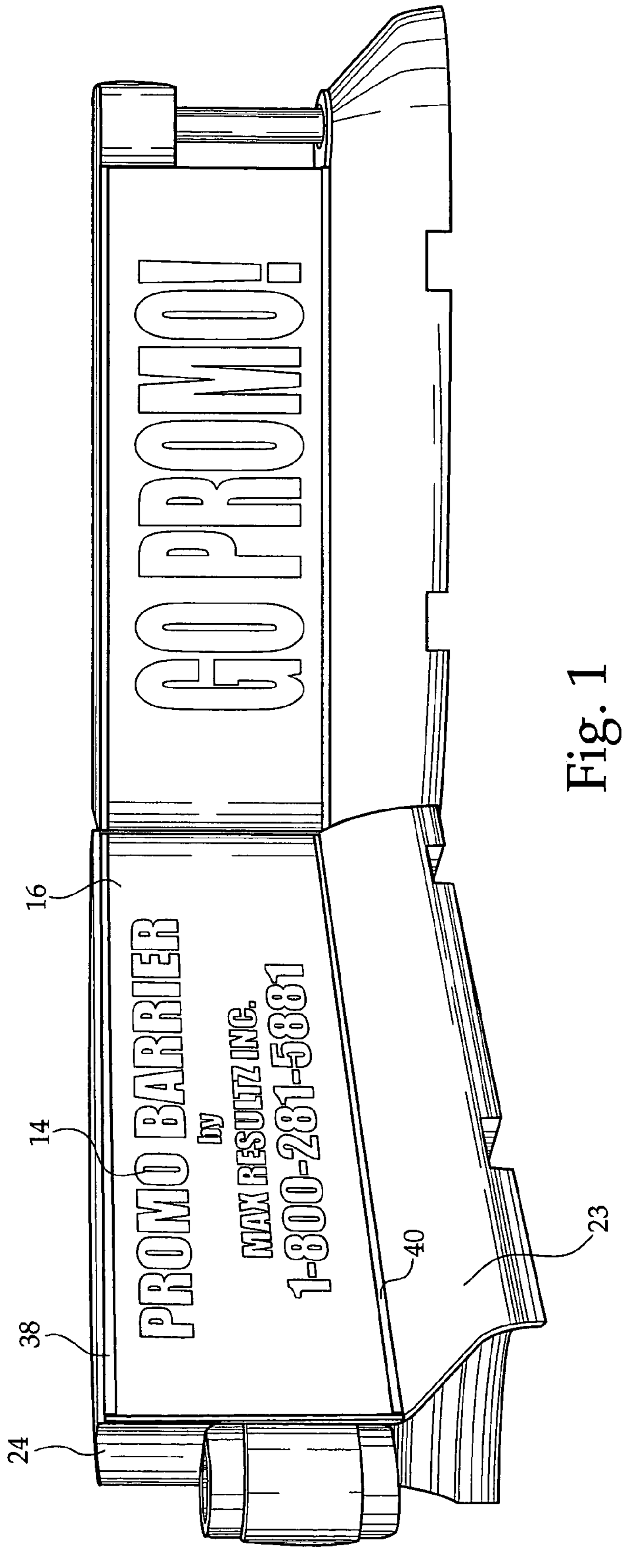
FIG. 1 is a perspective view of two road barriers interlocked, with a display assembly mounted on each barrier.
Figure 2:
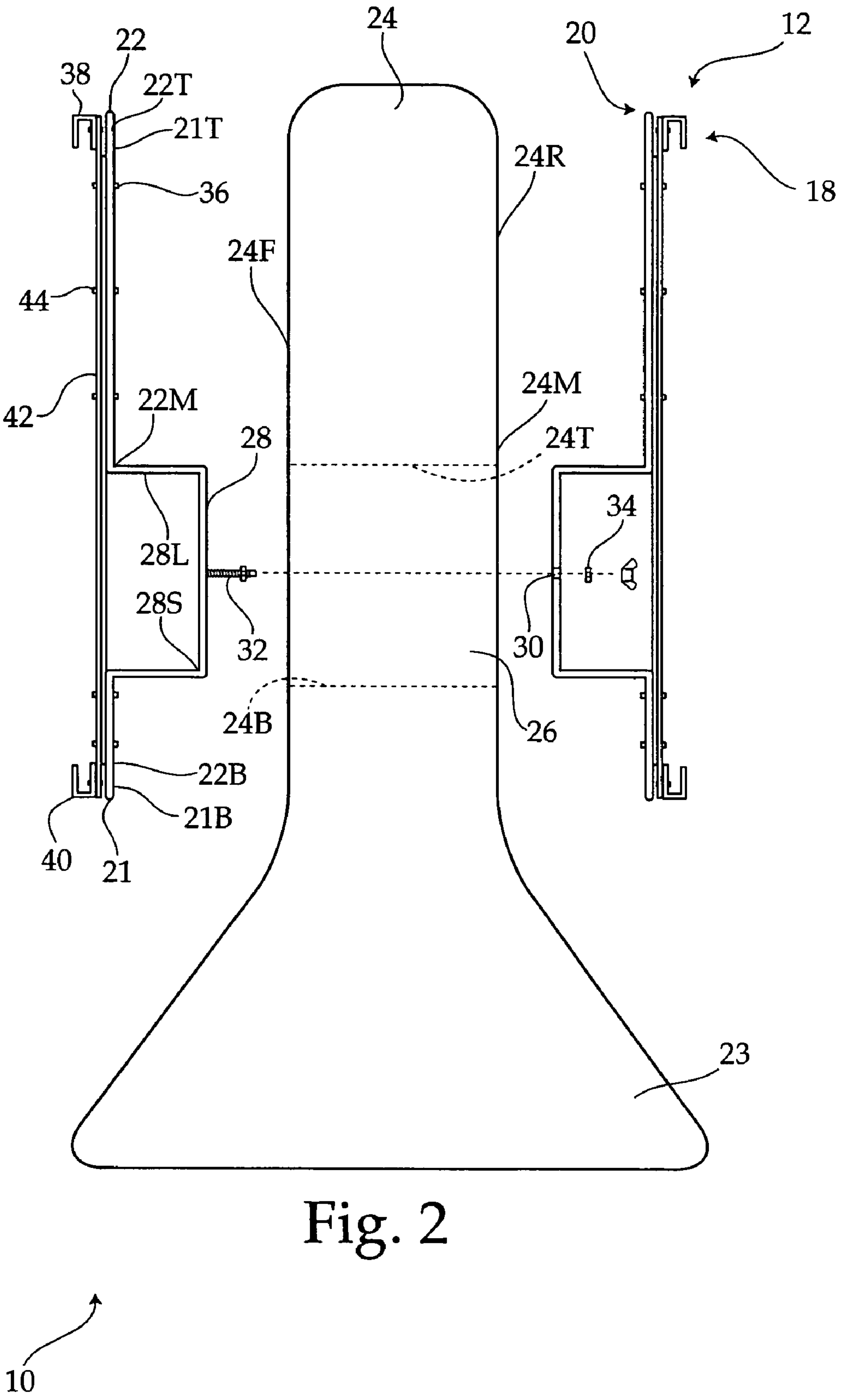
FIG. 2 is an exploded side elevational view, illustrating installment of the display assembly onto the road barrier.
Figure 3:
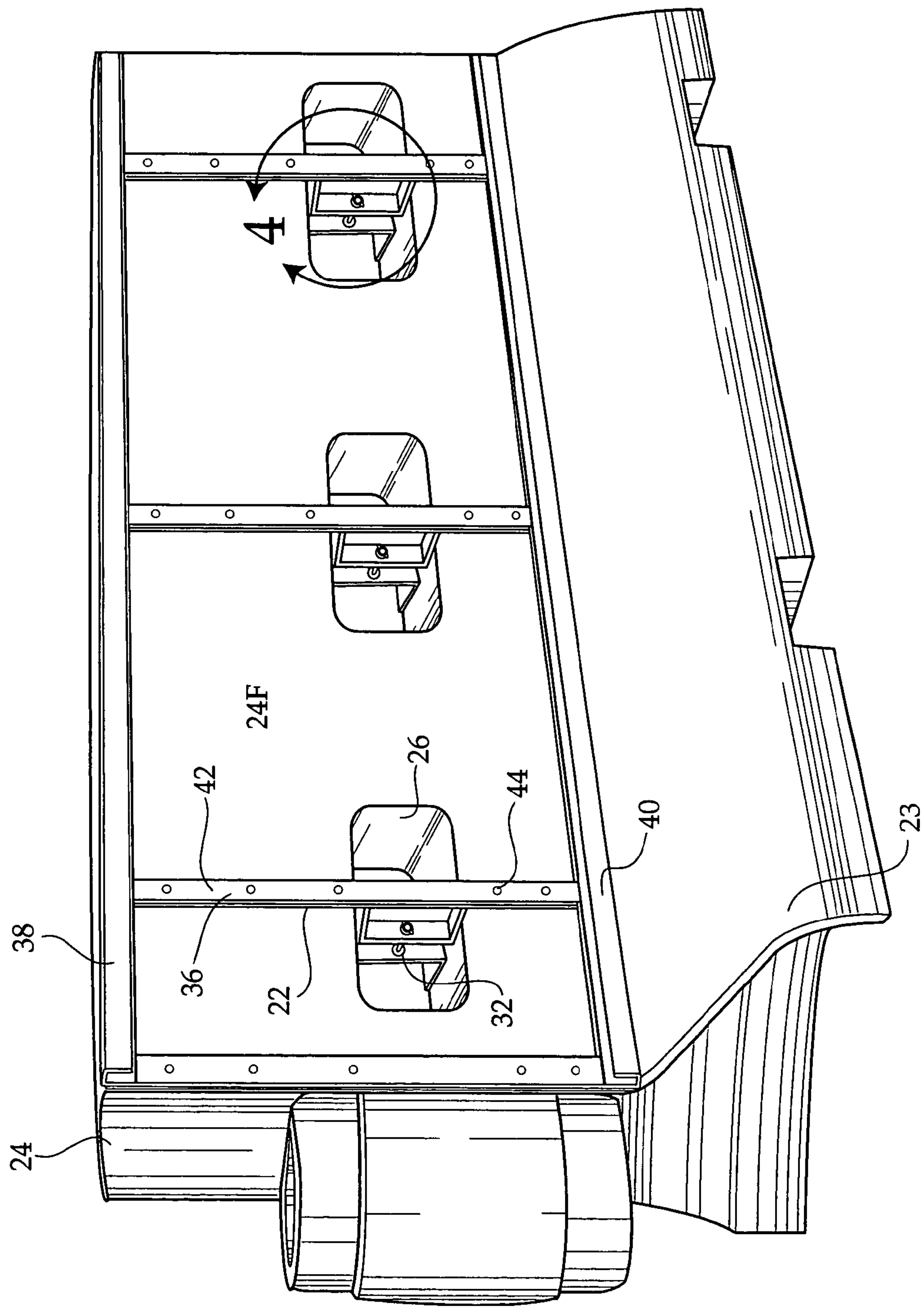
FIG. 3 is a perspective view of the barrier with the display assembly mounted therein, illustrating a pair of mounting brackets secured to each other within and a panel sleeve secured to the road barrier vertical partition.

10 road barrier
12 display assembly
14 advertisement
16 panel
18 panel sleeve
20 mounting bracket
21 mounting bracket outer frame
21T mounting bracket outer frame top horizontal piece
21B mounting bracket outer frame bottom horizontal piece
22 mounting bracket vertical support
22T mounting bracket vertical support top end
22B mounting bracket vertical support bottom end
22M mounting bracket vertical support middle portion
23 road barrier horizontal base
24 road barrier vertical partition
24F road barrier vertical partition front surface
24R road barrier vertical partition rear surface
24M road barrier vertical partition mid portion
24T road barrier vertical partition top
24B road barrier vertical partition bottom
26 transverse thru cavity
28 C-shaped insert
28L transverse leg
28S longitudinal shoulder
30 C-shaped insert shoulder aperture
32 fastening device
34 nut
38 panel sleeve top lip
40 panel sleeve bottom lip
42 panel sleeve vertical beams
44 rivet

DETAILED DESCRIPTION OF THE PREFERRED EMBODIMENTS

FIG. 1 illustrates two interlocking road barriers 10, wherein each barrier 10 has a display assembly 12 secured thereto for holding and displaying advertisements 14. The display assembly 12 essentially comprises a panel 16 on which the advertisement 14 is printed, a panel sleeve 18 for holding the panel 16 in place, and a pair of mounting brackets 20 for coupling the panel sleeve 18 with the barrier 10.

The road barrier 10 employed is the fillable type having a hollow interior, said barrier 10 having a horizontal base 23 and a vertical partition 24 extending upwardly therefrom. Both the horizontal base 23 and vertical partition 24 are substantially hollow and watertight, but are in fluid communication with each other. The vertical partition 24 has a vertical partition top 24T, a vertical partition bottom 24B which adjoins the horizontal base 23, a mid portion 24M, a front surface 24F, and a rear surface 24R. A plurality of transverse thru cavities 26 extend through the mid portion 24M, extending from the front surface 24F to the rear surface 24R. The cavities 26 are positioned between the vertical partition top 24T and vertical partition bottom 24B and are longitudinally spaced along the vertical partition 24. The barrier illustrated in FIG. 1 has three transverse thru cavities which are sealed above, below, and to the sides thereof to maintain the fluid integrity of the vertical partition even above said thru cavities 26.

The mounting brackets 20 are designed for coupling to each other within the transverse thru cavities 26 in order to hold the panel sleeve 18 against the vertical partition 24 of the barrier 10. The bracket 20 has an outer frame 21 having a top horizontal piece 21T and a bottom horizontal piece 21B. Several vertical supports 22 extend between the top and bottom horizontal pieces 21T, 21B of the frame 21 and are secured thereto. Each vertical support 22 has a top end 22T, a bottom end 22B, and a C-shaped insert 28 therebetween. The C-shaped insert 28 extends inward from each vertical support 22, said insert 28 sized to be compatible with the transverse thru cavity 26. The number of vertical supports 22 in each mounting bracket 20 is dependent on the number of cavities 26 in each barrier 10.

The insert 28 has two parallel transverse legs 28L each attached and extending perpendicularly to one of the vertical support top end 22T and the bottom end 22B, and a longitudinal shoulder 28S extending between the transverse legs 28L. The C-shaped inserts 28 are spaced according to the positioning of the cavities 26 in the barrier 10. Thus, when the mounting bracket 20 is held vertically against either the front or rear surface 24F, 24R of the barrier vertical partition 24, the C-shaped insert 28 of each vertical support is extended into one of the transverse thru cavities 26, thereby allowing the bracket to be mounted flushed against said barrier 10.

One mounting bracket 20 is mounted against the barrier vertical partition front surface 24F and one bracket 20 is mounted against the barrier vertical partition rear surface 24R. The C-shaped inserts 28 of each bracket 20 are then extended through the transverse thru cavities 26. Each insert 28 is approximately one-half the width of each cavity 26. Thus, when a pair of brackets 20 are positioned such that one of said brackets 20 extends against the front surface 24F, and the other of said brackets 20 extends against the rear surface 24R of the barrier vertical partition 24, the C-shaped inserts 28 extend within the cavities 26 such that the shoulders 28S abut each other within the cavities 26. According to the present invention, the brackets 20 are held in place by attaching said C-shaped inserts 28 to each other. Accordingly, each insert shoulder 28S has an aperture 30 extending therethrough, said aperture 30 in the same position on each shoulder 28S. When positioned correctly in the cavity 26, the apertures 30 of the two inserts 28 are aligned and a fastening device 32, namely a bolt, is inserted therethrough. A nut 34 is attached onto the bolt to selectively secure the mounting brackets 20 in place within the barrier vertical partition 24.

The panel sleeve 18 comprises a horizontal top lip 38 oriented downward, a horizontal bottom lip 40 oriented upward, and a plurality of vertical beams 42 extending therebetween. The spacing between the vertical beams 42 corresponds to the spacing between the mounting bracket vertical supports 22. Thus, when the panel sleeve 18 is properly positioned over the mounting bracket 20, the vertical beams 42 extend directly over the vertical supports 22. A plurality of rivets 44 extend through the vertical supports 22 of the mounting bracket 20 and the vertical beams 42 of the panel sleeve, in corresponding positions, in effect laminating the vertical supports 22 to the vertical beams 42 thus serving to mount the panel sleeve 18 atop the mounting bracket 20.

Figure 4:
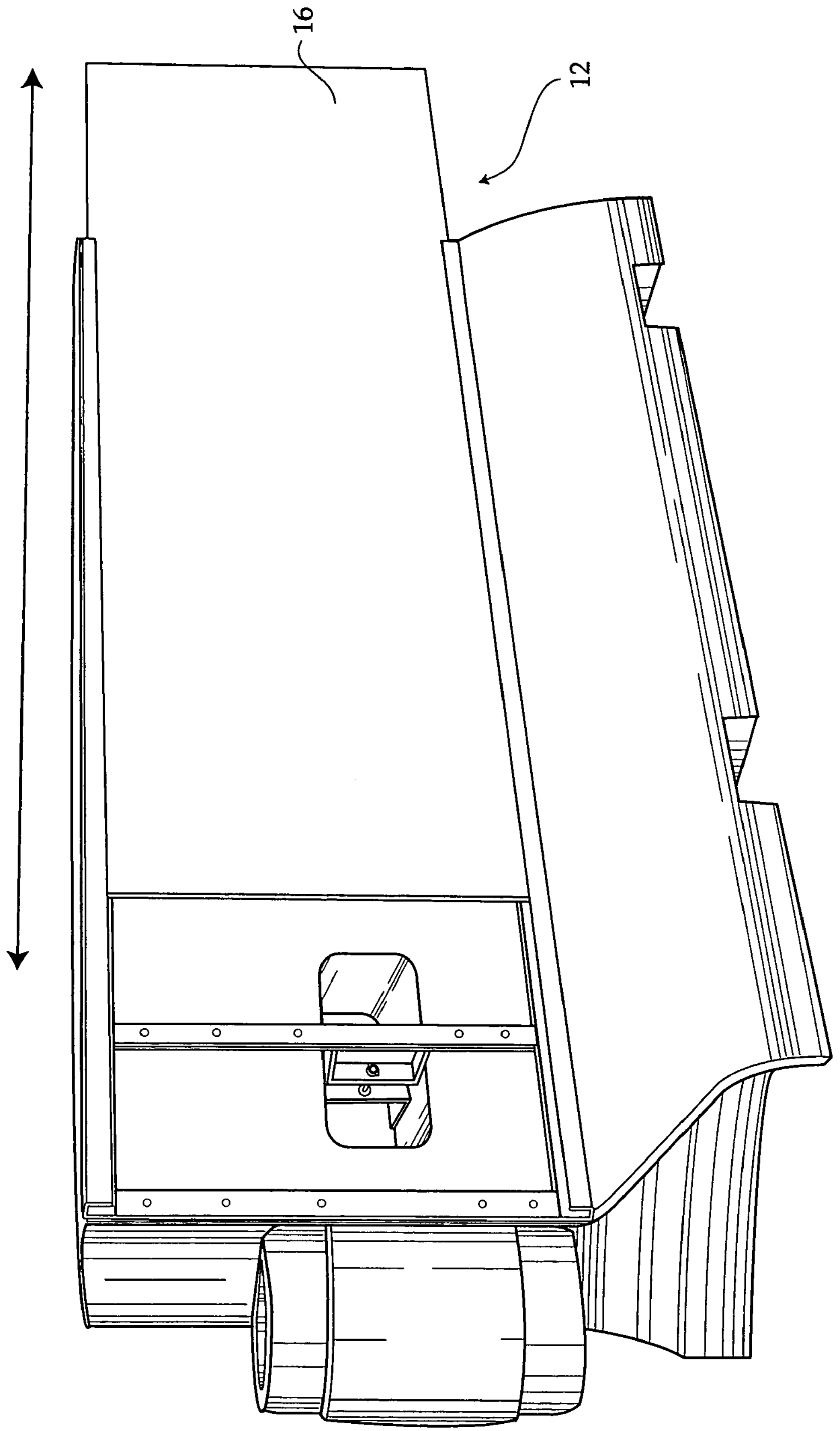
FIG. 4 is a perspective view of the display assembly coupled with the road barrier, illustrating the panel being inserted within the panel sleeve.

Once the display assembly is securely in place by securing the panel assemblies 18 against opposite sides of the barrier vertical partition 24 by connecting their respective mounting brackets 20 within the transverse cavities 26, the advertisement panels 16 may be inserted therein. When the panel sleeve 18 is properly mounted, the lips 38, 40 are oriented outward from the barrier 10 and are opposed from each other. The panels 16 with the advertisements 14 may then be slid longitudinally into place from beside the display assembly as illustrated in FIG. 4, with the panels 16 extending between the panel sleeve top lip 38 and bottom lip 40.

A brief summary of the manner of displaying the advertisement panel upon the road barrier is provided as follows: Initially, the display assembly is attached onto the road barrier by positioning one of the mounting brackets against the front surface, and positioning the other against rear surface of the partition, such that their inserts extends partially into the transverse cavity and are mated together within the transverse cavity. In particular, the inserts are mated by bringing the longitudinal shoulders of the two inserts into close proximity and then fastening them together. Then, the advertisement panel can be displayed upon the road barrier by inserting the advertisment panel between the horizontal top lip and horizontal bottom lip.

In conclusion, herein is presented a method for displaying an advertisement panel upon a road barrier having transversely extending cavities by attaching a display assembly thereto. The invention is illustrated by example in the drawing figures, and throughout the written description. It should be understood that numerous variations are possible, while adhering to the inventive concept. Such variations are contemplated as being a part of the present invention.

What is claimed is:

1. A display method, for mounting an advertisement panel upon a road barrier having a horizontal base, a vertical partition having a front surface and a rear surface, and at least one transverse cavity extending fully between the front and rear surfaces of the vertical partition, using a device having a pair of mounting brackets having a vertical support and an insert capable of extending into the transverse cavity, the device having a panel assembly having a horizontal top lip and a horizontal bottom lip, the panel assembly attached to one of the mounting brackets comprising the steps of:

positioning the vertical support of one of the mounting brackets against one of the front surface and rear surface of the partition by placing the insert of said mounting bracket partially into one of the transverse cavities of the vertical support;

positioning the vertical support of the other of the mounting brackets against the other of the front surface and rear surface of the partition by placing the insert of said mounting bracket into said transverse cavity;

mating the inserts together to maintain the vertical supports securely against the front and rear surfaces of the vertical partition, respectively; and displaying the advertisement panel on the road barrier by inserting the advertisement panel between the horizontal top lip and horizontal bottom lip.

2. The display method as recited in claim 1, wherein each vertical support has a top piece and a bottom piece, and wherein each insert is C-shaped having a pair of transverse legs which are attached to the top and bottom piece respectively, and a longitudinal shoulder extending therebetween, and wherein the step of mating the inserts further comprises:

bringing the longitudinal shoulder of the two inserts into close proximity within the transverse cavity of the road barrier; and fastening the longitudinal shoulders together with a fastening device.

* * * * *